United States Patent
Carbune et al.

(10) Patent No.: US 12,423,119 B2
(45) Date of Patent: Sep. 23, 2025

(54) AUTOMATED CONTENT SWITCHING RULE FOR CONTROLLING ACCESS TO INTERACTIVE CONTENT ON A COMPUTING DEVICE

(71) Applicant: GOOGLE LLC, Mountain View, CA (US)

(72) Inventors: Victor Carbune, Zurich (CH); Matthew Sharifi, Kilchberg (CH)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/372,471

(22) Filed: Sep. 25, 2023

(65) Prior Publication Data

US 2024/0012660 A1   Jan. 11, 2024

Related U.S. Application Data

(63) Continuation of application No. 17/665,643, filed on Feb. 7, 2022, now Pat. No. 11,775,324.

(51) Int. Cl.
*G06F 40/30* (2020.01)
*G06F 3/048* (2013.01)
*G06F 9/451* (2018.01)

(52) U.S. Cl.
CPC .............. *G06F 9/451* (2018.02); *G06F 40/30* (2020.01)

(58) Field of Classification Search
CPC .......... G06F 9/451; G06F 40/30; G06F 3/048; H04N 21/2387; H04N 21/23424; H04N 21/47217
See application file for complete search history.

(56) References Cited

U.S. PATENT DOCUMENTS

| 8,989,564 B2 * | 3/2015 | Vallone ............ H04N 21/47217 386/351 |
| 9,017,078 B2 | 4/2015 | Gross |

(Continued)

FOREIGN PATENT DOCUMENTS

| EP | 2759954 | 7/2014 |
| WO | 2013096944 | 6/2013 |

OTHER PUBLICATIONS

European Patent Office; International Search Report and Written Opinion issued in Application No. PCT/US2022/038499; 10 pages; dated Nov. 28, 2022.

(Continued)

*Primary Examiner* — Mahelet Shiberou
(74) *Attorney, Agent, or Firm* — Gray Ice Higdon

(57) ABSTRACT

Automated content switching rules may be generated and/or utilized for automatically switching away from certain interactive content during presentation of that interactive content when one or more switch conditions are met. In some instances, automated content switching rules may define one or more non-temporal switch conditions, e.g., based upon reaching certain points or milestones in certain interactive content, that may be used to initiate actions that switch away from the interactive content. In addition, in some instances, automated content switching rules may be used to not only switch away from particular interactive content, but additionally switch to other interactive content, thereby enabling a user to effectively schedule a workflow across different interactive content, applications and/or other computer-related tasks.

10 Claims, 7 Drawing Sheets

(56) References Cited

U.S. PATENT DOCUMENTS

| | | |
|---|---|---|
| 9,760,254 B1 | 9/2017 | Donnelley et al. |
| 10,896,671 B1 | 1/2021 | Mohajer et al. |
| 10,922,357 B1 | 2/2021 | Chennuru et al. |
| 11,087,634 B2 | 8/2021 | Chambers |
| 11,494,647 B2* | 11/2022 | Pouran Ben Veyseh ................. G06F 18/2113 |
| 2009/0259926 A1* | 10/2009 | Deliyannis ............ G06F 16/951 715/205 |
| 2013/0041665 A1 | 2/2013 | Jang |
| 2014/0283012 A1 | 9/2014 | Eggerton et al. |
| 2015/0229867 A1* | 8/2015 | Jojic ...................... H04N 5/445 348/468 |
| 2015/0352444 A1* | 12/2015 | Smith ................... A63F 13/537 463/31 |
| 2017/0094343 A1* | 3/2017 | Greene ................. G06V 20/46 |
| 2017/0302876 A1 | 10/2017 | Orad et al. |
| 2019/0019426 A1 | 1/2019 | Chambers |
| 2020/0333929 A1* | 10/2020 | Bhullar .............. G06Q 10/1095 |
| 2021/0064746 A1* | 3/2021 | Koide ................... H04L 63/145 |
| 2022/0283923 A1* | 9/2022 | Udipi ...................... H04L 67/55 |
| 2023/0124296 A1* | 4/2023 | Ngo ....................... G06N 3/044 704/9 |
| 2023/0251877 A1 | 8/2023 | Carbune et al. |

OTHER PUBLICATIONS

European Patent Office, Communication pursuant to Article 94(3) EPC issued in Application No. 22754708.0, 6 pages, dated Jun. 30, 2025.

* cited by examiner

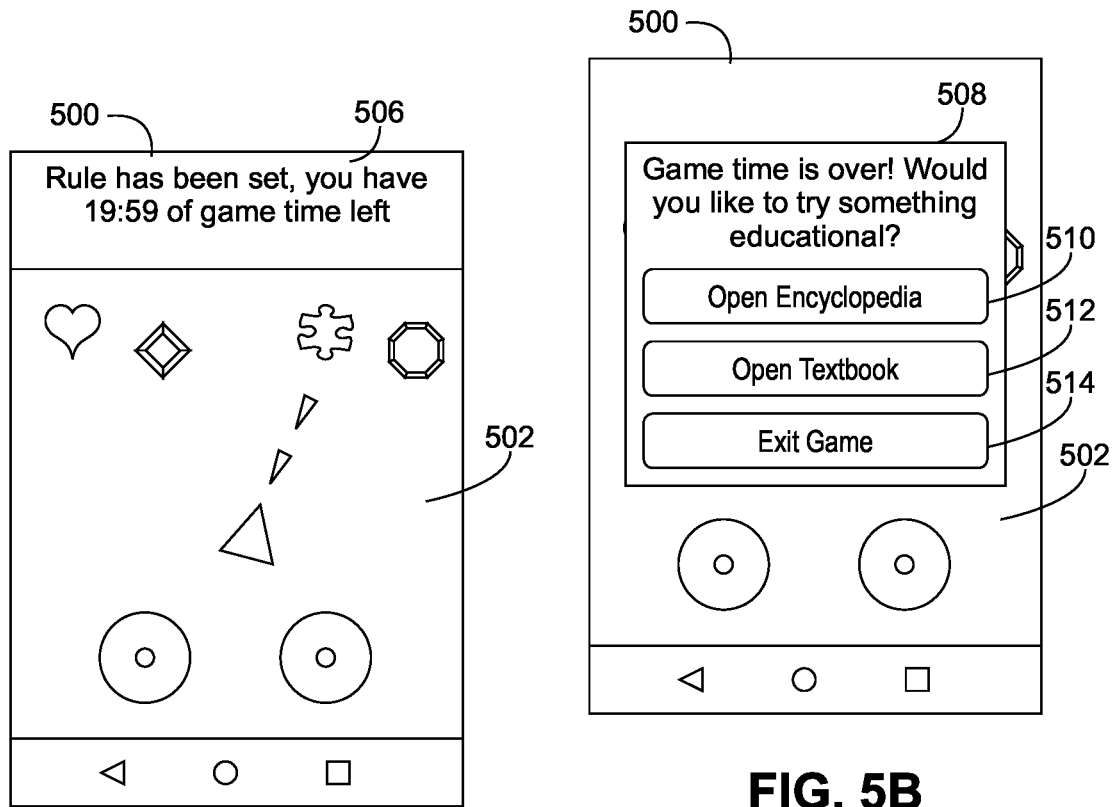
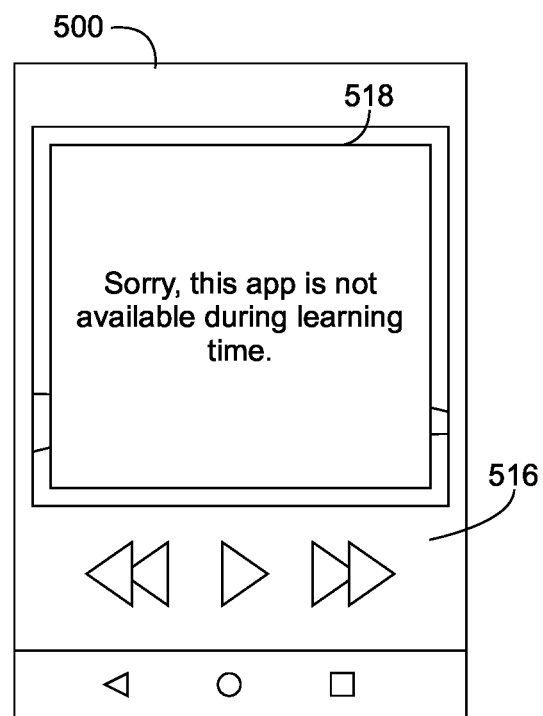
FIG. 5A
FIG. 5B
FIG. 5C

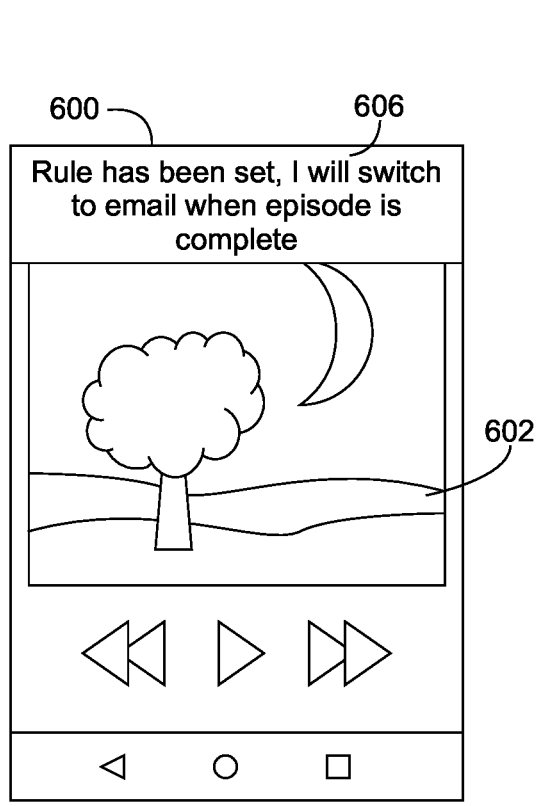
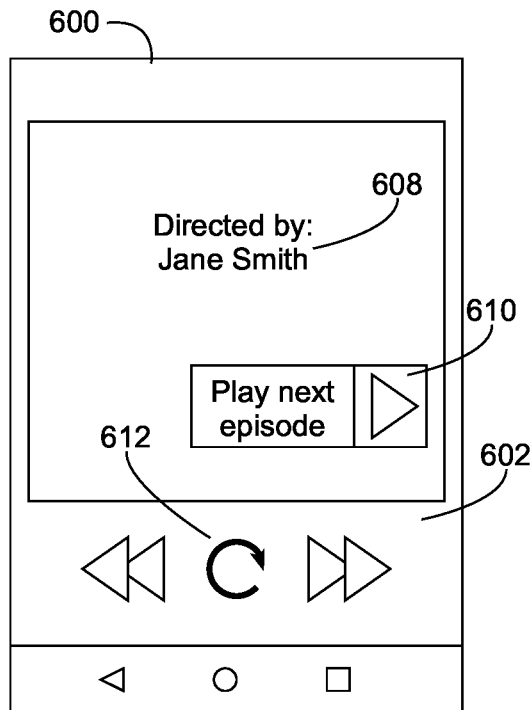
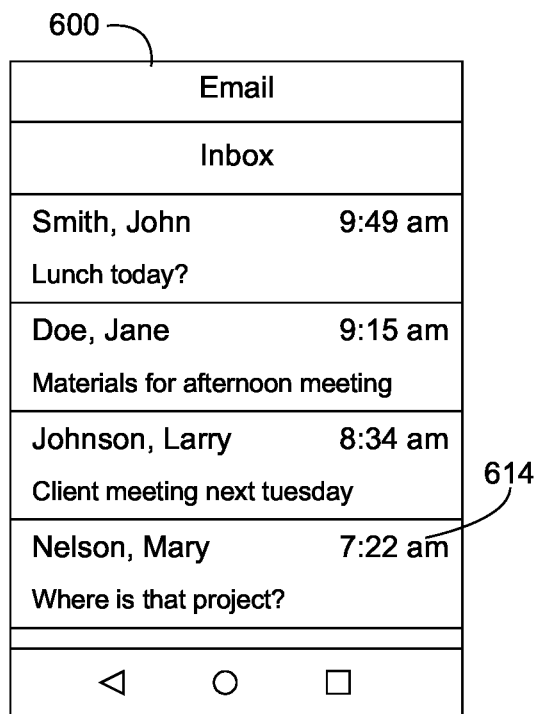
FIG. 6A
FIG. 6B
FIG. 6C

AUTOMATED CONTENT SWITCHING RULE FOR CONTROLLING ACCESS TO INTERACTIVE CONTENT ON A COMPUTING DEVICE

BACKGROUND

Computing devices have become ubiquitous in everyday life for various purposes, including business, education, and entertainment. In addition, user interaction with computing devices has increasingly relied on interactive software applications referred to herein as "automated assistants" (also referred to as "chatbots," "interactive personal assistants," "intelligent personal assistants," "personal voice assistants," "conversational agents," etc.). For example, humans (which when they interact with automated assistants may be referred to as "users") may provide commands and/or requests to an automated assistant using spoken natural language input (i.e., utterances), which may in some cases be converted into text and then processed, and/or by providing textual (e.g., typed) natural language input. An automated assistant generally responds to a command or request by providing responsive user interface output, which may include audible and/or visual user interface output.

Automated assistants enable users to obtain information, access services, and/or perform various tasks. For example, users are able to execute searches, get directions, and in some cases, interact with on-device applications and third party computing services. Users may also be able to perform a variety of actions, such as calling cars from ride-sharing applications, ordering goods or services (e.g., pizza), controlling smart devices (e.g., light switches), making reservations, and so forth.

Automated assistants may converse with users using voice recognition and natural language processing, with some also utilizing machine learning and other artificial intelligence technologies, for instance, to predict user intents. Automated assistants may be adept at holding conversations with users in natural, intuitive ways, in part because they understand dialog context. To utilize dialog context, an automated assistant may preserve recent inputs from the user, questions that came from the user, and/or responses/questions provided by the automated assistant. Automated assistants may also be generally aware of the state of a computing device when commands or requests are made by users, such that the state may also be considered when attempting to determine a user's intent.

Considering the ubiquity of computing devices, many users spend a considerable amount of time each day interacting with their computing devices and consuming various types of interactive content, including for example, games, multimedia content, applications, etc. Because of this, it may be desirable to limit the amount of time users spend on certain content on their computing devices, particularly when that content comes at the expense of other tasks that users should possibly be doing. Users, for example, may use the same computing device, e.g., a mobile phone, both for personal/entertainment and business-related purposes, and too much time spent interacting with personal interactive content, such as watching videos, browsing social media, playing games, etc. may be detrimental to completing other work-related tasks in a timely fashion. Moreover, parents may be interested in limiting the amount of time that their children spend on certain types of content, such as games or videos, particularly if they come at the expense of schoolwork.

SUMMARY

Techniques are described herein for generating and/or utilizing user-generated automated content switching rules that, during presentation of interactive content presented on a user computing device, may be used to automatically switch away from the interactive content when one or more switch conditions are met. In some implementations, for example, automated content switching rules may define one or more non-temporal switch conditions, e.g., based upon reaching certain points or milestones in certain interactive content, that may be used to initiate actions that switch away from the interactive content. In addition, in some implementations, automated content switching rules may be used to not only switch away from particular interactive content, but additionally switch to other interactive content, thereby enabling a user to effectively schedule a workflow across different interactive content, applications and/or other computer-related tasks.

Therefore, consistent with one aspect of the invention, a method may include, in response to user input, generating an automated content switching rule for a user computing device, the automated content switching rule associated with interactive content presented on the user computing device, and the automated content switching rule including a switch condition defining a non-temporal triggering event for the interactive content and a conditioned action configured to initiate at least one operation on the user computing device to discontinue user interaction with the interactive content in response to the switch condition being met. The method may further include, during presentation of the interactive content on the user computing device, determining if the switch condition of the automated content switching rule has been met, and in response to determining that the switch condition of the automated content switching rule has been met, executing the conditioned action to initiate the at least one operation on the user computing device to discontinue user interaction with the interactive content.

In some implementations, the interactive content includes an application, a video game, a video, a movie, a song, an e-book, a web page, or social media content. Also, in some implementations, the non-temporal triggering event specifies completion of the interactive content. Further, in some implementations, the non-temporal triggering event specifies reaching a predetermined point or milestone in the interactive content. In some implementations, the predetermined point or milestone includes an end point, a level, a predetermined event, a chapter, an episode, a game, or a video. In addition, in some implementations, the non-temporal triggering event specifies availability or reception of separate interactive content. In some implementations, the switch condition further defines a temporal triggering event, the temporal triggering event specifying a duration or a time.

In addition, in some implementations, the at least one operation for the conditioned action is configured to restrict future user interaction with the interactive content, and executing the conditioned action to initiate the at least one operation on the user computing device includes blocking a subsequent user attempt to interact with the interactive content. Moreover, in some implementations, the at least one operation for the conditioned action is configured to restrict future user interaction with an application, a function of an application, or a category or type of interactive content, application or function. In some implementations, the at least one operation for the conditioned action is configured to restrict user access to the user computing device, and executing the conditioned action to initiate the at least one operation on the user computing device includes locking the user computing device. Moreover, in some implementations, the conditioned action is further configured to present second interactive content to the user in response to the switch condition being met, and executing the conditioned action further includes initiating at least one operation on the user computing device to present the second interactive content to the user.

In some implementations, the conditioned action is further configured to initiate an operation to instruct an application to control presentation of the second interactive content. In addition, in some implementations, executing the conditioned action further includes prompting a user to select the second interactive content.

In some implementations, determining if the switch condition of the automated content switching rule has been met includes receiving a state update from an application presenting the interactive content on the user computing device through an Application Programming Interface (API). Moreover, in some implementations, determining if the switch condition of the automated content switching rule has been met includes performing image and/or view hierarchy analysis of a user interface for an application presenting the interactive content on the user computing device. Also, in some implementations, determining if the switch condition of the automated content switching rule has been met includes performing semantic analysis of an application state for an application presenting the interactive content on the user computing device.

In some implementations, the user input includes a natural language input, and generating the automated content switching rule includes performing user intent classification with an automated assistant to determine the switch condition and conditioned action for the automated content switching rule. In addition, in some implementations, the switch condition is a first switch condition and the conditioned action is a first conditioned action, the automated content switching rule further includes a second switch condition and a second conditioned action configured to initiate at least one operation on the user computing device in response to the second switch condition being met, and the second switch condition is activated only after the first switch condition is met and the first conditioned action is executed.

Consistent with another aspect of the invention, a method may include, in response to user input, generating an automated content switching rule for a user computing device, the automated content switching rule associated with first interactive content presented on the user computing device, and the automated content switching rule including a switch condition defining a triggering event for the first interactive content and a conditioned action configured to initiate at least one operation on the user computing device to discontinue user interaction with the first interactive content and present second interactive content to the user in response to the switch condition being met. The method may also include, during presentation of the interactive content on the user computing device, determining if the switch condition of the automated content switching rule has been met, and in response to determining that the switch condition of the automated content switching rule has been met, executing the conditioned action to initiate the at least one operation on the user computing device to discontinue user interaction with the first interactive content and present the second interactive content to the user.

In addition, some implementations may include a system including one or more processors and memory operably coupled with the one or more processors, where the memory stores instructions that, in response to execution of the instructions by one or more processors, cause the one or more processors to perform any of the aforementioned methods. Some implementations may also include at least one non-transitory computer-readable medium including instructions that, in response to execution of the instructions by one or more processors, cause the one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 5A, FIG. 5B, AND FIG. 5C illustrate an example graphical user interface for use in generating and executing an automated content switching rule, in accordance with various implementations.

FIG. 6A, FIG. 6B, AND FIG. 6C illustrate another example graphical user interface for use in generating and executing an automated content switching rule, in accordance with various implementations.

DETAILED DESCRIPTION

Implementations consistent with the invention may be used to generate and utilize user-generated automated content switching rules that, during presentation of interactive content presented on a user computing device, may be used to automatically switch away from the interactive content when one or more switch conditions are met. In some implementations, for example, automated content switching rules may be used in connection with screen time management, e.g., to manage the amount of time a user is permitted to interact with certain types of content. In other implementations, however, automated content switching rules may be used to more generally control a user's workflow, e.g., to automate switching between different interactive content when user-specified switch conditions are met.

Figure 1:
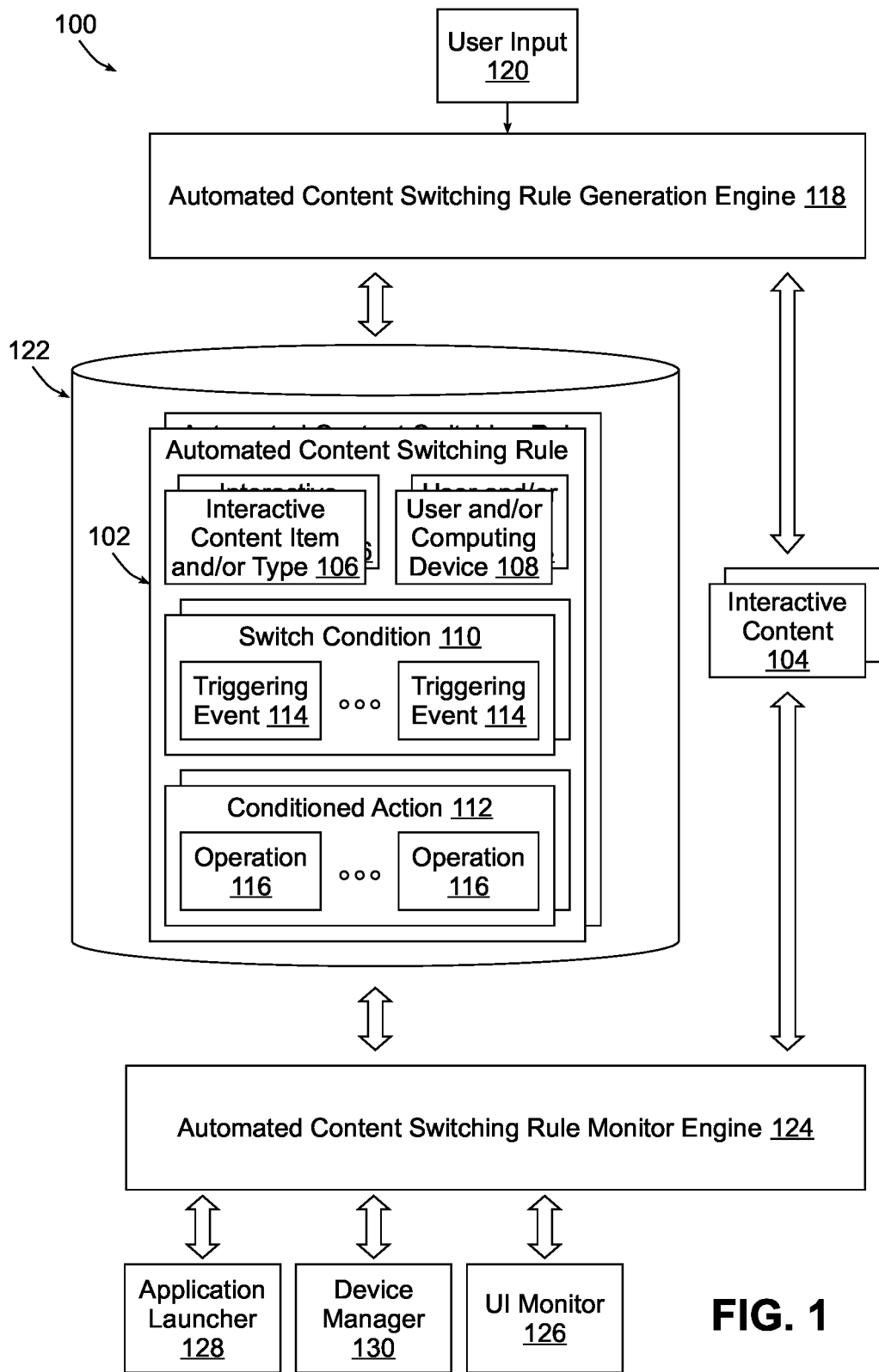
FIG. 1 is a block diagram of an example computing environment in which implementations disclosed herein may be implemented.

FIG. 1, for example, illustrates an example computing environment or system 100 consistent with some implementations of the invention, and suitable for generating and/or utilizing one or more automated content switching rules 102 for switching away from and/or to various types of interactive content 104 consistent with some implementations of the invention.

In this regard, interactive content 104 may generally be considered to include various types of content that may be presented to a user on a computing device, including but not limited to, for example, executable programs such as applications, apps, video games, etc.; multimedia content such as videos, movies, songs, e-books, social media content, etc.; web pages and other browser-accessible content; etc. It will be appreciated that while some content may be inherently linear and presentable without substantial user interaction (e.g., as in the case of movies, songs, emails, e-books, etc.), such content may still be considered to be interactive content in some implementations due to the fact that a user is permitted via an interactive application to control the presentation of such content. For a movie or video, for example, a video application may provide user controls to allow for pausing, restarting, rewinding, fast forwarding, etc.

In turn, an automated content switching rule 102, within the context of the disclosure, may be associated with one or more items and/or types of interactive content 106, as well as with one or more users and/or computing devices 108, and may be considered to incorporate one or more switch conditions 110 and one or more conditioned actions 110 that are selectively performed in response to a switch condition being met during presentation of the associated interactive content. In some instances, the items and/or types of interactive content with an automated switching rule may also be considered to be switch conditions for an automated content switching rule, such that the rule is effectively activated when user interaction with the interactive content for the rule is detected.

An automated switching rule 102, for example, may be associated in some instances with a particular item of interactive content, e.g., "game a," "movie b," or "web site c." In other instances, however, an automated switching rule may be associated with a particular type of interactive content, e.g., "all games," "non-educational movies," "social media web sites," etc.

In addition, an automated switching rule 102 may be associated with one or more users and/or one or more computing devices 108. Absent specification by a user, for example, a rule 102 may be associated with the same user that generated the rule, and the same computing device through which the user generated the rule. In other instances, however, the users and/or computing devices may be specified, e.g., "only allow educational content on my children's devices after this episode is over," etc.

In addition, a switch condition 110 in some implementations may be associated with one or more triggering events 114 associated with the associated interactive content. A triggering event 114, in some instances, may be temporal in nature, e.g., "after 30 minutes of video playback" or "after 1 hour of browsing social media." In other instances, a triggering event 114 may be non-temporal in nature, and may be associated with reaching predetermined points or milestones in the interactive content such as levels of a game, or completion of an end point, predetermined event, game, chapter, episode, video or other point of demarcation of some interactive content, e.g., "after this level is finished," "once this episode finishes," "once this game is over," "when I collect this item," "when I finish this chapter," etc. A triggering event 114 may also be associated with availability or reception of separate interactive content, e.g., "until I receive an email from John Smith," "until 5 minutes before my scheduled web conference," etc. Moreover, multiple triggering events 114 may be used, and may be combined using different logical constructions, e.g., "after 30 minutes or after I finish this level, whichever comes first."

A conditioned action 112 in some implementations may be associated with one or more operations 116 performed on a user computing device in response to a switch condition 110 being met, and may generally be associated with switching away from, or discontinuing user interaction with, the interactive content being presented when the switch condition is met. In some instances, a conditioned action 112 may be associated solely with discontinuing user interaction such as through disabling, blocking, locking or otherwise restricting access to interactive content, an application, a function of an application, a category or type of interactive content, application or function, or an entire computing device, e.g., "lock computing device," "close the app," "block all non-educational content," etc. In other implementations, however, a conditioned action may additionally be associated with switching to other interactive content, or to a specific activity or location in certain interactive content, e.g., "view my work email inbox," "open my math textbook," "open my web conferencing software," etc. In some instances, for example, the conditioned action may be used to configure the computing device to at least temporarily block subsequent attempts by a user to interact with the interactive content, an application or function of an application, or a category or type of interactive content, application or function.

As noted above, an automated content switching rule 102 consistent with the invention is user generated, and may be generated, for example, in response to user interaction with an automated assistant, or otherwise input through a user interface of a computing device, e.g., using an automated content switching rule generation engine 118, which receives user input 120 from a user of a user computing device. The user input 120 that generates an automated content switching rule may be spoken, entered using natural language text, entered using a multimedia user interface, or using some combination of different user input types.

Automated content switching rule generation engine 118 may additionally be responsive to interactive content 104, e.g., the interactive content with which a user is currently interacting, as well as other contextual information useful for generating an automated content switching rule. For example, automated content switching rule generation engine 118 may determine what interactive content 104 is currently being presented in order to determine with which interactive content a new rule should be associated. Thus, for example, if a user inputs "make sure I respond to all of my emails once I'm done playing this game," generation engine 118 may determine the specific game that the user is currently playing and associate the rule with that particular game.

Generated automated content switching rules 102 may be stored, for example, in a database or other data store 122, and once activated, accessed by an automated content switching rule monitor engine 124 to determine whether, based upon the current context of a user device, a particular switch condition 110 has been met, and if so, which conditioned action(s) 112 should be executed. Assessment of switch conditions 110 may be based, for example, through analysis of interactive content 104, e.g., to determine the current state of the interactive content, through analysis of a user interface on a device (e.g., using a user interface (UI) monitor engine 126), receipt of state update from an application (e.g., through an API) or in other manners that will be appreciated by those of ordinary skill having the benefit of the instant disclosure. Then, whenever a switch condition 110 has been found to have been met, one or more associated conditioned actions 112 may be executed, e.g., through control over interactive content 104, through interaction with an application launcher 128 (e.g., to launch an application and/or establish a rule that inhibits launch of an application), through interaction with a device manager 130 (e.g., to lock a device, to shut down an application, etc.), or in other manners that will be appreciated by those of ordinary skill having the benefit of the instant disclosure.

It will be appreciated that the user and/or computing device to which an automated content switching rule is applied may or may not be different from the user and/or computing device upon which automated content switching rule is generated, i.e., each of automated content switching rule generation engine 118, database 122 and automated content switching rule monitor engine 124 may be disposed on the same computing device or on a different computing device, including in a remote or cloud-based computing device, and in some instances, portions of one or more of such components may be distributed among multiple computing devices. In the case of screen time management, for example, a parent may generate an automated switching rule on his or her computing device, or on a household automated assistant computing device, that applies to computing device (s) of his or her child or children.

It will also be appreciated that automated content switching rules, and generation and execution thereof in the various manners described herein, may provide a number of technical advantages. In some implementations, for example, the determinations of when switch conditions are met and/or the execution of conditioned actions may be implemented in some implementations through inter-application controls, e.g., whereby an application such as assistant application and/or an operating system may be able to analyze the current state of other applications and/or control other applications, in some instances using heuristic and/or semantic-based approaches. In some instances, for example, APIs may be provided to facilitate state detection and/or control over applications, and in some instances, image analysis of application interfaces may be used in connection with the analysis of switch conditions. Deriving the state of an application in such a manner may in particular provide a substantial benefit in terms of avoiding the need for individual applications to be specifically coded to report their various states or otherwise be controllable by automated content switching rules, thereby potentially reducing the size and/or resource requirements of individual applications. Further, in implementations in which an automated assistant is used to generate and/or monitor automated content switching rules, rules may be established in a computationally efficient manner, as in many cases a single spoken utterance of user to an automated assistant may be used to achieve monitoring and control over various applications on a computing device without the need for a user to navigate through separate steps and/or separate application-specific interfaces, thereby substantially reducing the utilization of computing device resources associated with generating and/ or monitoring automated content switching rules, and enabling in some instances switch conditions and/or conditioned actions that are not necessarily explicitly predefined.

Figure 2:
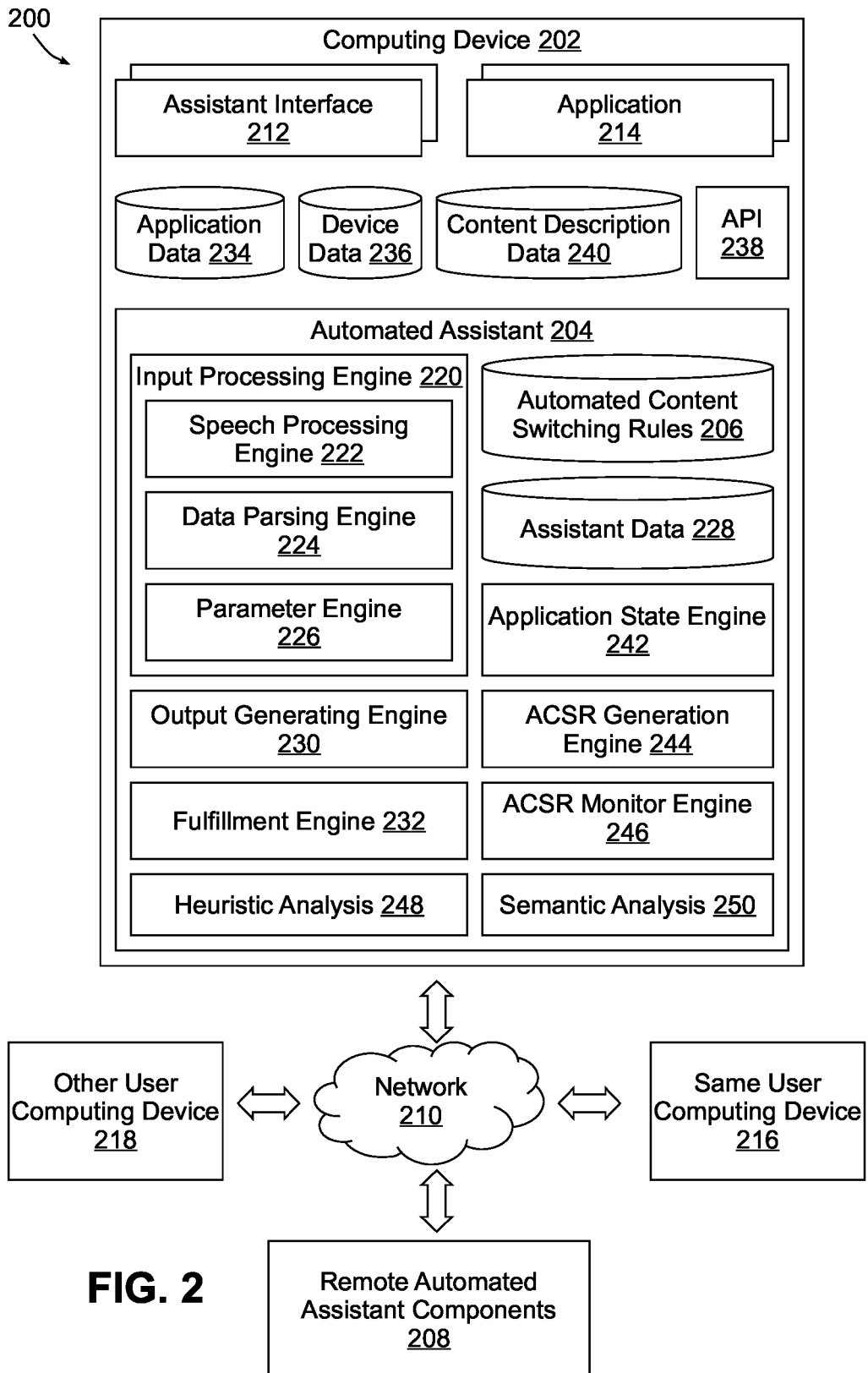
FIG. 2 is a block diagram of another example computing environment in which implementations disclosed herein may be implemented.

While the invention is not so limited, in some implementations at least a portion of the functionality associated with generation and/or utilization of automated content switching rules may be implemented within an automated assistant. FIG. 2, for example, illustrates a system 200 including a computing device 202 incorporating an automated assistant 204 that may be used to generate and utilize automated content switching rules, e.g., stored in a data store 206.

Automated assistant 204 may operate as part of an assistant application that is provided at one or more computing devices, such as computing device 202 and/or one or more server devices, e.g., as represented by remote automated assistant components 208 that are accessible over a network 210. A user may interact with automated assistant 204 via assistant interface(s) 212, which may be a microphone, a camera, a touch screen display, a user interface, and/or any other apparatus capable of providing an interface between a user and an application. For instance, a user may initialize automated assistant 204 by providing a verbal, textual, and/or a graphical input to an assistant interface 212 to cause automated assistant 204 to perform a function (e.g., provide data, control a peripheral device, access an agent, generate an input and/or an output, etc.). Computing device 202 may include a display device, which may be a display panel that includes a touch interface for receiving touch inputs and/or gestures for allowing a user to control applications 214 of computing device 202 via the touch interface. In some implementations, computing device 202 may lack a display device, thereby providing an audible user interface output, without providing a graphical user interface output. Furthermore, computing device 202 may provide a user interface, such as a microphone, for receiving spoken natural language inputs from a user. In some implementations, computing device 202 may include a touch interface and may be void of a camera and/or a microphone, but may optionally include one or more other sensors.

Computing device 202 and/or other computing devices, e.g., other computing devices 216 used by the same user as computing device 202 and computing devices 218 of other users, may be in communication with a server device (e.g., hosting one or more remote automated assistant components 208) over a network, such as the internet. Additionally, computing device 202 and any other computing devices 216, 218 may be in communication with each other over a local area network (LAN), such as a Wi-Fi network. Computing device 202 may offload computational tasks to the server device in order to conserve computational resources at computing device 202. For instance, the server device may host automated assistant 204, and/or computing device 202 may transmit inputs received at one or more assistant interfaces 212 to the server device. However, in some implementations, automated assistant 204 may be hosted at computing device 202, and various processes that may be associated with automated assistant operations may be performed at computing device 202.

In various implementations, all or less than all aspects of automated assistant 204 may be implemented on computing device 202. In some of those implementations, aspects of automated assistant 204 are implemented via computing device 202 and may interface with a server device, which may implement other aspects of automated assistant 204. The server device may optionally serve a plurality of users and their associated assistant applications via multiple threads. In implementations where all or less than all aspects of automated assistant 204 are implemented via computing device 202, automated assistant 204 may be an application that is separate from an operating system of computing device 202 (e.g., installed "on top" of the operating system)—or may alternatively be implemented directly by the operating system of computing device 202 (e.g., considered an application of, but integral with, the operating system).

In some implementations, automated assistant 204 may include an input processing engine 220, which may employ multiple different modules for processing inputs and/or outputs for computing device 202 and/or a server device. For instance, input processing engine 220 may include a speech processing engine 222, which may process audio data received at an assistant interface 212 to identify the text embodied in the audio data. The audio data may be transmitted from, for example, computing device 202 to the server device in order to preserve computational resources at computing device 202. Additionally, or alternatively, the audio data may be exclusively processed at computing device 202.

The process for converting the audio data to text may include a speech recognition algorithm, which may employ neural networks, and/or statistical models for identifying groups of audio data corresponding to words or phrases. The text converted from the audio data may be parsed by a data parsing engine 224 and made available to automated assistant 204 as textual data that may be used to generate and/or identify command phrase(s), intent(s), action(s), slot value(s), and/or any other content specified by the user. In some implementations, output data provided by data parsing engine 224 may be provided to a parameter engine 226 to determine whether the user provided an input that corresponds to a particular intent, action, and/or routine capable of being performed by automated assistant 204 and/or an application or agent that is capable of being accessed via automated assistant 204. For example, assistant data 228 may be stored at the server device and/or computing device 202, and may include data that defines one or more actions capable of being performed by automated assistant 204, as well as parameters necessary to perform the actions. The parameter engine 212 may generate one or more parameters for an intent, action, and/or slot value, and provide the one or more parameters to an output generating engine 230. Output generating engine 230 may use the one or more parameters to communicate with an assistant interface 212 for providing an output to a user, and/or communicate with one or more applications 214 for providing an output to one or more applications 214.

In some implementations, automated assistant 204 may be an application that may be installed "on-top of" an operating system of computing device 202 and/or may itself form part of (or the entirety of) the operating system of computing device 202. The automated assistant application may include, and/or have access to, on-device speech recognition, on-device natural language understanding, and on-device fulfillment. For example, on-device speech recognition may be performed using an on-device speech recognition module that processes audio data (detected by the microphone(s)) using an end-to-end speech recognition machine learning model stored locally at computing device 202. The on-device speech recognition may generate recognized text for a spoken utterance (if any) present in the audio data. Also, for example, on-device natural language understanding (NLU) may be performed using an on-device NLU module that processes recognized text, generated using the on-device speech recognition, and optionally contextual data, to generate NLU data. NLU data may include intent(s) that correspond to the spoken utterance and optionally parameter(s) (e.g., slot values) for the intent(s).

On-device fulfillment may be performed using an on-device fulfillment engine 232 that utilizes the NLU data (from the on-device NLU), and optionally other local data, to determine action(s) to take to resolve the intent(s) of the spoken utterance (and optionally the parameter(s) for the intent). This may include determining local and/or remote responses (e.g., answers) to the spoken utterance, interaction(s) with locally installed application(s) to perform based on the spoken utterance, command(s) to transmit to internet-of-things (IoT) device(s) (directly or via corresponding remote system(s)) based on the spoken utterance, and/or other resolution action(s) to perform based on the spoken utterance. The on-device fulfillment may then initiate local and/or remote performance/execution of the determined action(s) to resolve the spoken utterance.

In various implementations, remote speech processing, remote NLU, and/or remote fulfillment may at least selectively be utilized. For example, recognized text may at least selectively be transmitted to remote automated assistant component(s) 208 for remote NLU and/or remote fulfillment. For instance, the recognized text may optionally be transmitted for remote performance in parallel with on-device performance, or responsive to failure of on-device NLU and/or on-device fulfillment. However, on-device speech processing, on-device NLU, on-device fulfillment, and/or on-device execution may be prioritized at least due to the latency reductions they provide when resolving a spoken utterance (due to no client-server roundtrip(s) being needed to resolve the spoken utterance). Further, on-device functionality may be the only functionality that is available in situations with no or limited network connectivity.

In some implementations, computing device 202 may include one or more applications 214 which may be provided by a third-party entity that is different from an entity that provided computing device 202 and/or automated assistant 204. Automated assistant 204 and/or computing device 202 may access application data 234 to determine one or more actions capable of being performed by one or more applications 214, as well as a state of each application of the one or more applications 214. Furthermore, the application data 234 and/or any other data (e.g., device data 236) may be accessed by automated assistant 204 to generate contextual data, which may characterize a context in which a particular application 214 is executing at computing device 202 and/or a particular user is accessing computing device 202.

While one or more applications 214 are executing at computing device 202, device data 236 may characterize a current operating status of each application 214 executing at computing device 202. Furthermore, the application data 234 may characterize one or more features of an executing application 214, such as content of one or more user interfaces being rendered at the direction of one or more applications 214. Alternatively, or additionally, an application may output information about its current state through an application programming interface (API) 238 (e.g., supported by an operating system or automated assistant 204), thereby enabling automated assistant 204 to track the status of the application. API 238 may also, in some instances, provide a pathway for automated assistant 204 or an operating system to control each application 214.

In some implementations, computing device 202 may store content description data 240, which may characterize various interactive content presented on computing device 202, e.g., by one or more applications 214. In some instances, the content description data may describe various GUI elements corresponding to one or more different applications 214, or alternatively, various characteristics of the content itself, and through which an automated assistant may be capable of analyzing the current state of the application for the purposes of assessing switch conditions. For example, when a particular application 214 is installed at computing device 202 and/or otherwise accessed by computing device 202, computing device 202 may download content description data 240 for the particular application 214. The content description data 240 may be accessed by automated assistant 204 in order to identify one or more GUI elements that represent a state of the application, and that may be updated as a user interacts with the application.

Computing device 202 and/or automated assistant 204 may further include an application state engine 242 that monitors the states of one or more applications, e.g., using application data 234, device data 236 and/or content description data 240, or via direct querying of applications through API 238, and thereby enable a determination of whether the switch condition of any automated content switching rule has been met.

Automated content switching rule (ACSR) generation and monitoring are performed by associated engines 244, 246, and in some instances, heuristic-based analysis 248 and/or semantic analysis 250 may be utilized by engines 244, 246 in generating and/or utilizing automated content switching rules, as will be discussed in greater detail below.

Figure 3:
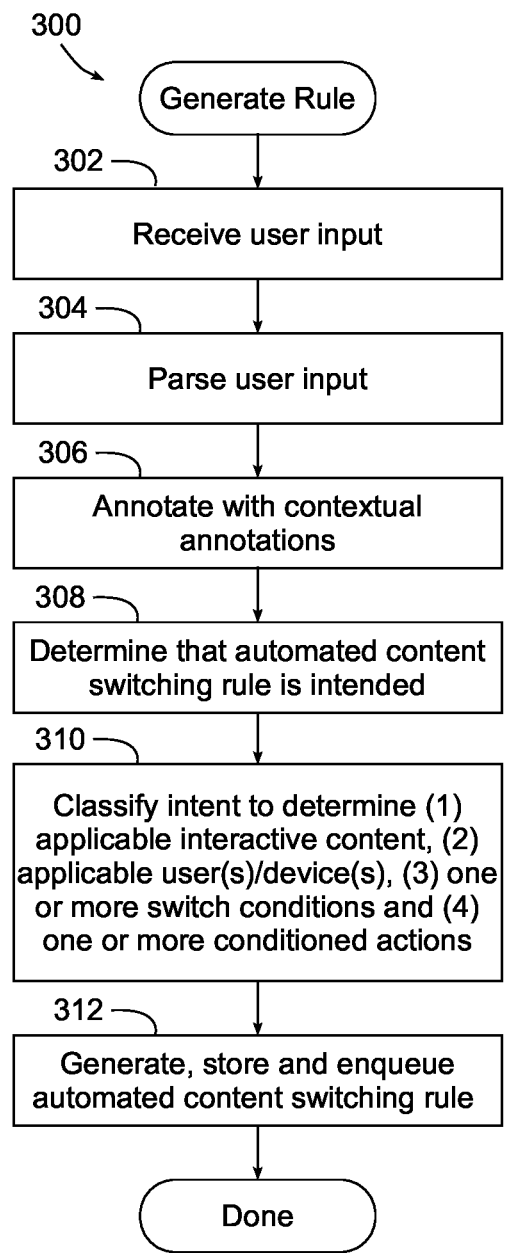
FIG. 3 is a flowchart illustrating an example sequence of operations for generating an automated content switching rule, in accordance with various implementations.

Now turning to FIG. 3, an example sequence of operations 300 for generating an automated content switching rule is illustrated in greater detail. Sequence 300 may be implemented, for example, by a computing device such as computing device 202 of FIG. 2, and utilizing an automated assistant such as automated assistant 204 (e.g., using ACSR generation engine 244), although in other implementations the generation of rules may be handled separately from any automated assistant and/or remotely, e.g., entirely or partially within a cloud-based service.

In block 302, user input is received from a user, e.g., via a spoken input, a text input, etc. Next, the user input is parsed (block 304) and optionally annotated with contextual annotations (e.g. app annotations) (block 306), e.g., using input processing engine 220. The annotations may include, for example, device data associated with the state of the computing device (e.g., what application is currently active), application data (e.g., the state of the active application) and/or content description data (e.g., the state of a video currently being played and/or user elements currently viewable on a display), or other contextual data that may be useful for deriving the intent of the user input.

Next, a determination is made that the user input is directed towards generating an automated content switching rule (block 308), as otherwise the user input may be handled in a conventional manner. In addition, in some implementations it may be desirable to perform voice verification (for spoken inputs) in block 308 to authorize creation of an automated content switching rule, which may be particularly beneficial, for example, for screen time management, so that only a parent is allowed to create, modify or delete automated content switching rules for their children. Then, user intent classification is performed (block 310) to determine (1) the interactive content and/or content type to which the user input is directed, (2) the applicable users and/or computing devices to which the user input is directed, (3) one or more switch conditions for the rule and (4) one or more conditioned actions for the rule.

The determined information may then be used to generate, store and enqueue a new automated content switching rule (block 312), thereby activating the rule for monitoring, e.g., by ACSR monitor engine 246.

User intent classification in block 310 may be performed in a number of different manners in different implementations. For example, user intent classification may be based upon heuristic matching of various expressions, or by using a machine learning model such as a neural network. Interpretation of the applicable content may include, for example, analysis of the active application on the computing device when the user input is received, or through analysis of the user input itself (e.g., "this game," "game A," "video B," "social media," "videos," "non-educational content," etc. Interpretation of the applicable users and/or computing devices may include, for example, analysis of the computing device that received the user input and/or the user of that computing device, or through analysis of the user input itself (e.g., "my children," "all of my devices," "my tablet," etc.).

Interpretation of the switch condition may be handled in a number of manners, e.g., by generating a matching score between the current displayed screen state and the user-provided condition description. The interpretation may further determine the manner in which the switch condition will be analyzed or tested during monitoring of the automated content switching rule.

In some implementations, for example, the analysis of a switch condition may be at least in part API-based, e.g., based upon signals provided by applications through an API. For example, applications may provide signals such as "video finished," "episode finished," "level finished," etc., to an automated or assistant or to the operating system through an API established for use by such applications. Alternatively, applications may make other API calls that are similarly indicative of relevant behaviors. Such calls may then be resolved against condition(s) that a user has specified.

In some implementations, the analysis of a switch condition may be at least in part heuristic-based, e.g., based upon application state determined via the state of the application as determined through analysis of the presentation of particular interactive content, using, for example, using heuristic analysis 248 and application state engine 242. As an example, "after video playback finishes" may generally imply 1) non-changing screen content and 2) the presence of a "play next" button or a large "replay button" or some other typical user interface elements in the active application. In some instances, for example, the exact user-provided text might appear on the screen, such as "after a confirmation is shown" may be easily triggered if the "confirmation" is detected on the screen. As such, heuristic analysis of a device display may be used in some instances (e.g., using heuristic analysis 248 of FIG. 2).

In some implementations, the analysis of a switch condition may be at least in part semantic-based, e.g., using semantic analysis 250. For example, the input "once I receive apartment details" may trigger execution of a neural network (e.g., implemented within semantic analysis 250 of FIG. 2) that gets as input both screen state (image, view hierarchy or both) as well as condition description, and outputs a similarity or relatedness score, and such analysis may be performed in some instances based on embeddings of both the screen (image) and the text. Such a neural network may be trained, for example, on labeled data of user descriptions of each screen content example.

Interpretation of a conditioned action may be relatively straightforward in the case of direct commands such as "open app" or "lock device." For less direct commands, more complex interpretation may be used, e.g., "only allow educational content," "make sure I go through all my emails," etc. Such indirect commands may, in some implementations, be handled using semantic analysis (e.g., implemented within semantic analysis 250 of FIG. 2). As an example, a user's request may also imply a category of application or other content, and it may further confine the user to specific parts of that content, e.g., certain functions or capabilities. In some instances, for example, operating system-level functionality may be supported to lock, block, disable or otherwise restrict user access to certain applications or interactive content or functions thereof. In some instances, an API may be provided, although other techniques, e.g., using screen analysis as described above, may be used to monitor what applications, content and/or functions a user may be attempting to access, so as to ensure that the user is not violating any established restrictions.

Once all details from the user's request are extracted, generation of the rule may occur, e.g., to create and enqueue an automated content switching rule in data store 206, and in some instances, an audio and/or visual confirmation to the user may be generated by output generating engine 230. In some instances, for example, an automated content switching rule may be implemented as a custom intent defining sequential triggering of other intents, e.g. "MultiIntent(Intent1=( . . . ), Intent2=( . . . ), TriggerCondition=( . . . ),)." During monitoring, such an intent may be split and fulfilled in an automated assistant stack as multiple steps, e.g., Intent1 is first handled and the trigger condition might never be fulfilled, in which case Intent2 never gets to be fulfilled either. Put another way, Intent2 may be activated only after the switch condition of Intent1 is met and the conditioned action of Intent1 is executed. A stack may support an orchestration to ensure that Intent2 is asynchronously held off in a ready-to-execute state—potentially with caching involved such that it executes quickly once the trigger condition is met.

Figure 4:
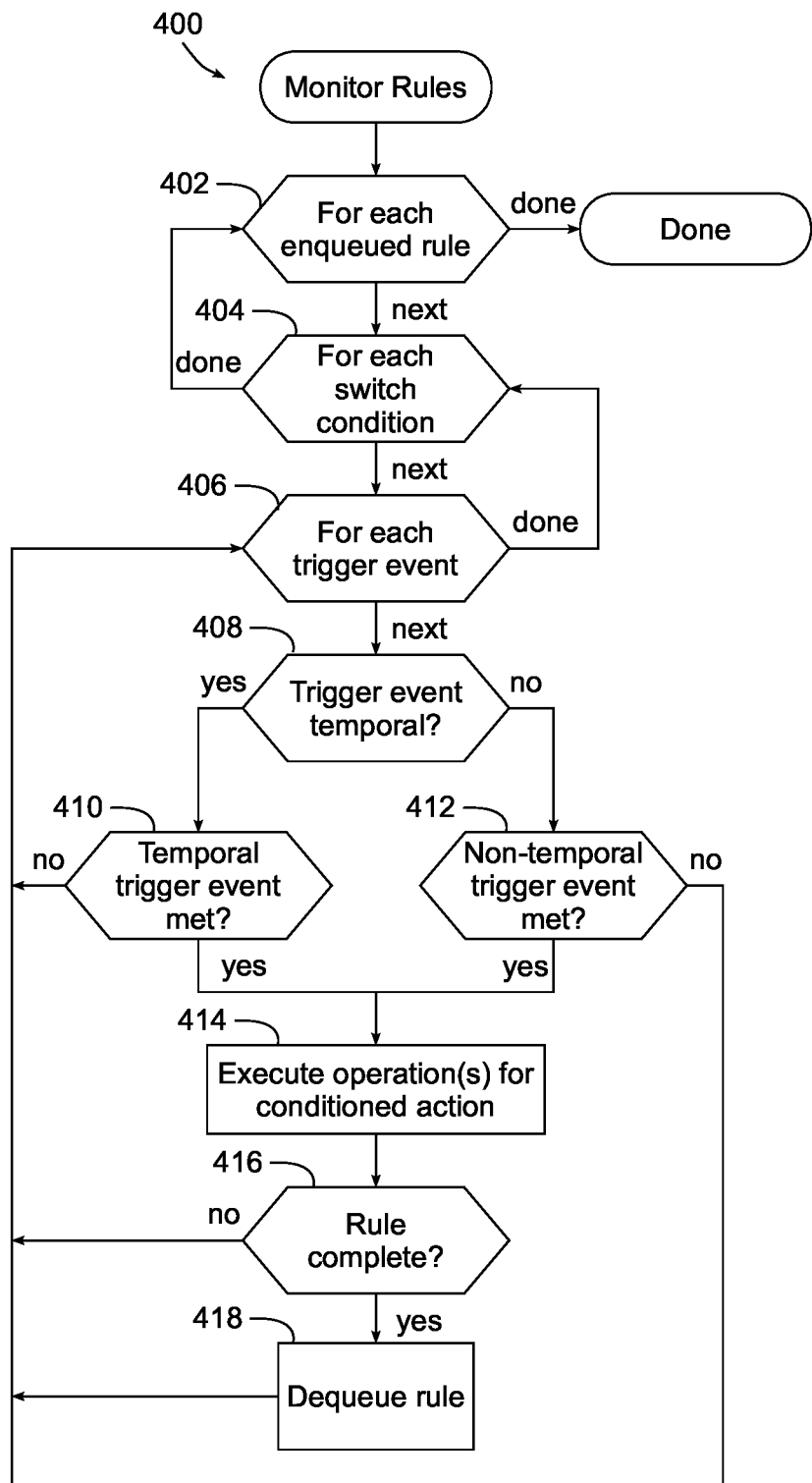
FIG. 4 is a flowchart illustrating an example sequence of operations for monitoring one or more automated content switching rules, in accordance with various implementations.

Now turning to FIG. 4, an example sequence of operations 400 for monitoring one or more automated content switching rules is illustrated in greater detail. Sequence 400 may be implemented, for example, by a computing device such as computing device 202 of FIG. 2, and utilizing an automated assistant such as automated assistant 204 (e.g., using ACSR monitor engine 246), although in other implementations the generation of rules may be handled separately from any automated assistant and/or remotely, e.g., entirely or partially within a cloud-based service.

Sequence 400 may be called, for example, on a periodic basis, and may loop through each enqueued or active automated content switching rules (block 402). For each rule, each switch condition thereof, and each trigger event of each switch condition, may be processed in iterative loops (represented by blocks 404 and 406). For each trigger event, for example, a determination may be made (block 408) as to whether the trigger event is temporal in nature. As noted above, a temporal trigger event may be based at least in part on time, e.g., a total duration (e.g., 30 minutes), a relative duration (e.g., 5 minutes after some event), a time of day (e.g., 5:00 pm), and may be tested in block 410. A non-temporal trigger event may be based on some condition that is not temporal in nature, e.g., reaching certain points or milestones in interactive content, the availability or reception of some other interactive content, etc., and may be tested in block 412. If the trigger condition is not met, control returns to block 406 to process additional trigger events for the same or other rules; however, if the trigger condition is met, the rule has been triggered, and control passes to block 414 to execute one or more operations associated with a conditioned action for the rule, as well as update the rule to indicate that the action has been performed.

The operation(s) performed in block 414 may include various operations that may generally be associated with switching away from, or discontinuing user interaction with, the interactive content being presented when the switch condition is met, and may additionally include switching to other interactive content, or to a specific activity or location in certain interactive content, as discussed in greater detail above. In addition, in some instances, operations may also be performed to present information, receive input and/or interact with a user in connection with restricting user interaction with interactive and/or switching to other interactive content. For example, in some implementations, it may be desirable to prompt a user with multiple options for selecting or switching to different interactive content that is enabled based upon any restrictions put in place as a result of the conditioned action being executed, e.g., if access is limited to educational content, a user may be prompted with one or more educational applications or interactive content that they may switch to.

Next, a determination is made as to whether the rule is complete (block 416), i.e., whether any additional trigger events and/or switch conditions remain to be triggered prior to completion of the rule. It will be appreciated, for example, that in some instances it may be desirable to create a rule having multiple switch conditions/conditioned actions that control a workflow through multiple steps. For example, for screen time management, it may be desirable to reenable a screen time restricted activity after some milestone or duration is reached. Thus, for example, a request such as "only allow educational content for the next hour after this level is finished" may be implemented as a rule having a first switch condition of reaching the end of the level for the current game being played and a first conditioned action of prohibiting non-educational content, and a second switch condition of a 60 minute duration and a second conditioned action of re-enabling non-educational content. Similarly, a request such as "make sure I respond to all of my emails once I'm done playing this game, and then return me to the game" may be implemented as a rule having a first switch condition of reaching the end of the current game being played and a first conditioned action of switching to an email app, and a second switch condition of all flagged emails being marked as complete and a second conditioned action of switching back to the game.

Thus, returning to block 416, if the rule is not complete, control returns to block 406 to process additional trigger events for the same or other rules. If, however, the rule is complete, control passes to block 418, where the rule is dequeued from the stack and thus deactivated. Control then returns to block 406 to process additional trigger events for the same or other rules. Once all rules have been processed, sequence 400 is complete.

FIGS. 5A-5C illustrate an example user interaction with an automated assistant in connection with generating and executing an automated content switching rule consistent with some implementations. FIG. 5A, for example, illustrates an example display 500 for a computing device, and where a user is currently playing a game represented at 502. As illustrated at 504, a user may issue a request to the assistant via the spoken language input "assistant, only allow educational content after 20 minutes of game time." As a result of this input, the assistant may generate and enqueue an automated content switching rule having a switch condition of "20 minutes of game time" (i.e., including a temporal trigger event) and a conditioned action of "disable non-educational content," and in some instances, may generate a responsive output such as illustrated at 506 ("Rule has been set, you have 19:59 of game time left"). At this point, the generated rule may be enqueued and monitored. Then, once the switch condition has been met (i.e., after 20 minutes of game time), the conditioned action (disable non-educational content) may be executed, and in this instance the user may be presented, e.g., as illustrated by dialog box 508 of FIG. 5B, with several operations for complying with the switch condition that has been met. User controls 510, 512, and 514, for example, illustrate several options that may be selected in some implementations, including opening an encyclopedia app (user control 510), opening a textbook (user control 512) or simply exiting the game (user control 514). Moreover, as illustrated in FIG. 5C, if the user attempts to access non-educational content (e.g., a video application or website 516), the user may be restricted from accessing the application or website, and may be prompted as such, as illustrated at 518.

FIGS. 6A-6C illustrate another example user interaction with an automated assistant in connection with generating and executing an automated content switching rule consistent with some implementations. FIG. 6A, for example, illustrates an example display 600 for a computing device, and where a user is currently watching a video in a video application or website represented at 602. As illustrated at 604, a user may issue a request to the assistant via the spoken language input "assistant, make sure I respond to all emails once this episode is over." As a result of this input, the assistant may generate and enqueue an automated content switching rule having a switch condition of "episode complete" (i.e., including a non-temporal trigger event) and a conditioned action of "switch to email application," and in some instances, may generate a responsive output such as illustrated at 606 ("Rule has been set, I will switch to email when episode is complete"). At this point, the generated rule may be enqueued and monitored.

Detection of the non-temporal trigger event for the switch condition (i.e., the episode being complete) may be performed in different manners in different implementations, e.g., as represented in FIG. 6B. For example, in some instances, an application state such as "episode complete" may be communicated by the application 602 through an API to notify the assistant of the change in state of the application. Alternatively, various screen elements may be analyzed to identify an episode completion. For example, image analysis of the video stream may be performed in some implementations, e.g., to identify end credits 608. Alternately, image and/or view hierarchy analysis of the user interface of application 602 may be performed, e.g., to identify a "play next episode" control 610 overlaid on the video stream, or another indicator of the end of episode being reached, such as a "replay" control 612 that replaces a play/pause control.

Then, once the switch condition has been determined to have been met (i.e., at the end of the episode), the conditioned action (switch to email) may be executed, e.g., as represented by the switch to email application 614 in FIG. 6C.

It will be appreciated that an innumerable number of different types of automated content switching rules may be generated in other implementations, so the invention is not limited to the specific examples set forth herein.

Figure 7:
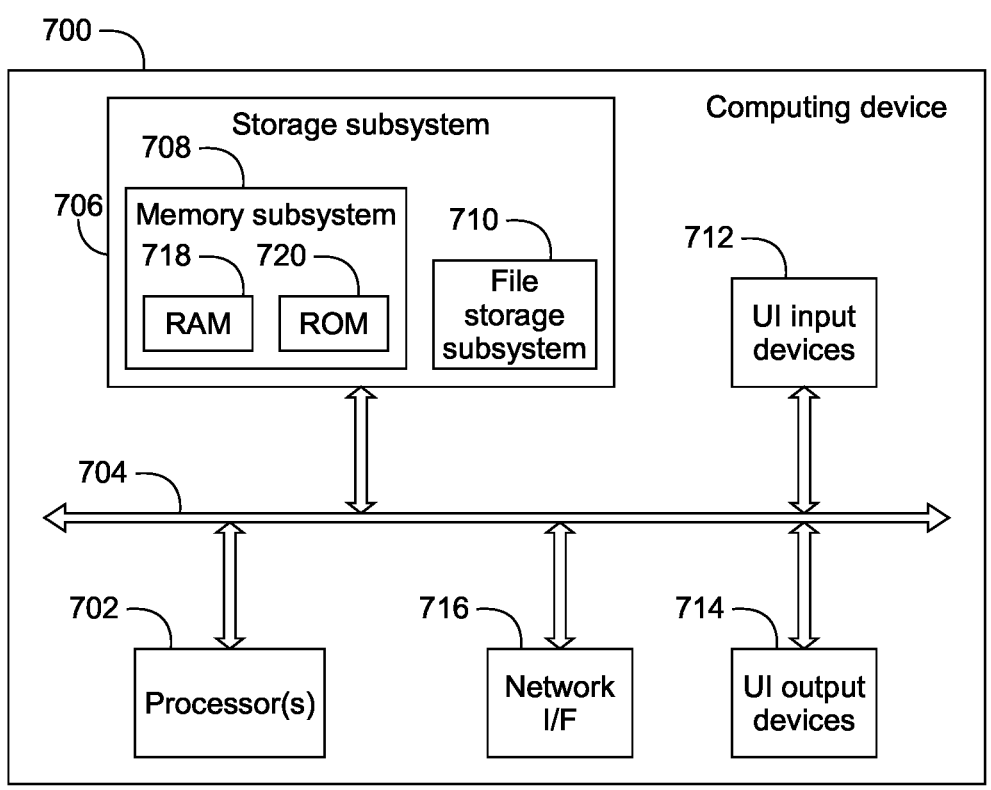
FIG. 7 illustrates an example architecture of a computing device.

FIG. 7 is a block diagram of an example computing device 700 suitable for implementing all or a part of the functionality described herein. Computing device 700 typically includes at least one processor 702 that communicates with a number of peripheral devices via bus subsystem 704. These peripheral devices may include a storage subsystem 706, including, for example, a memory subsystem 708 and a file storage subsystem 710, user interface input devices 712, user interface output devices 714, and a network interface subsystem 716. The input and output devices allow user interaction with computing device 700. Network interface subsystem 716 provides an interface to outside networks and is coupled to corresponding interface devices in other computing devices.

User interface input devices 712 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 700 or onto a communication network.

User interface output devices 714 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 700 to the user or to another machine or computing device.

Storage subsystem 706 stores programming and data constructs that provide the functionality of some or all of the modules described herein. For example, the storage subsystem 706 may include the logic to perform selected aspects of the various sequences illustrated in FIGS. 3-4.

These software modules are generally executed by processor 702 alone or in combination with other processors. Memory 708 used in the storage subsystem 706 can include a number of memories including a main random access memory (RAM) 718 for storage of instructions and data during program execution and a read only memory (ROM) 720 in which fixed instructions are stored. A file storage subsystem 710 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 710 in the storage subsystem 706, or in other machines accessible by the processor(s) 702.

Bus subsystem 704 provides a mechanism for enabling the various components and subsystems of computing device 700 to communicate with each other as intended. Although bus subsystem 704 is shown schematically as a single bus, alternative implementations of the bus subsystem may use multiple busses.

Computing device 700 can be of varying types including a mobile device, a smartphone, a tablet, a laptop computer, a desktop computer, a wearable computer, a programmable electronic device, a set top box, a dedicated assistant device, a workstation, a server, a computing cluster, a blade server, a server farm, or any other data processing system or computing device. Due to the ever-changing nature of computers and networks, the description of computing device 700 depicted in FIG. 7 is intended only as a specific example for purposes of illustrating some implementations. Many other configurations of computing device 700 are possible having more or fewer components than computing device 700 depicted in FIG. 7.

In situations in which the systems described herein collect personal information about users, or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method, comprising:
   in response to user input, generating an automated content switching rule for a user computing device, the automated content switching rule associated with interactive content presented on the user computing device, and the automated content switching rule including:
      a switch condition defining a non-temporal triggering event for the interactive content; and
      a conditioned action configured to initiate at least one operation on the user computing device to discontinue user interaction with the interactive content in response to the switch condition being met; and
   during presentation of the interactive content on the user computing device, and using instructions external from an application presenting the interactive content on the user computing device:
      performing image and/or view hierarchy analysis of a user interface for the application presenting the interactive content on the user computing device, wherein performing the image and/or view hierarchy analysis of the user interface attempts to identify an appearance of a control in the user interface overlaying the interactive content and configured to replay the interactive content or play a next interactive content;
      using a result of the image and/or view hierarchy analysis of the user interface for the application, determining if the switch condition of the automated content switching rule has been met; and
   in response to determining that the switch condition of the automated content switching rule has been met, executing the conditioned action to initiate the at least one operation on the user computing device to discontinue user interaction with the interactive content.

2. The method of claim 1, wherein the interactive content includes a video game, a video, a movie, a song, an e-book, a web page, or social media content, wherein the non-temporal triggering event specifies reaching a predetermined point or milestone in the interactive content, and wherein the predetermined point or milestone includes an end point, a level, a predetermined event, a chapter, an episode, a game, or a video.

3. The method of claim 1, wherein the at least one operation for the conditioned action is configured to restrict future user interaction with the interactive content, wherein executing the conditioned action to initiate the at least one operation on the user computing device includes blocking a subsequent user attempt to interact with the interactive content, and wherein the at least one operation for the conditioned action is configured to restrict future user interaction with the application, a function of the application, or a category or type of interactive content, application or function.

4. The method of claim 1, wherein the user input includes a natural language input, and wherein generating the automated content switching rule includes performing user intent classification with an automated assistant to determine the switch condition and conditioned action for the automated content switching rule.

5. The method of claim 1, wherein the switch condition is a first switch condition and the conditioned action is a first conditioned action, wherein the automated content switching rule further includes a second switch condition and a second conditioned action configured to initiate at least one operation on the user computing device in response to the second switch condition being met, and wherein the second switch condition is activated only after the first switch condition is met and the first conditioned action is executed.

6. A method, comprising:
   in response to user input, generating an automated content switching rule for a user computing device, the automated content switching rule associated with interactive content presented on the user computing device, and the automated content switching rule including:
      a switch condition defining a non-temporal triggering event for the interactive content; and
      a conditioned action configured to initiate at least one operation on the user computing device to discontinue user interaction with the interactive content in response to the switch condition being met; and
   during presentation of the interactive content on the user computing device, and using instructions external from an application presenting the interactive content on the user computing device:
      performing semantic analysis of an application state for the application presenting the interactive content on the user computing device using a neural network configured to receive a screen state of the application and a condition description of the switch condition, wherein the screen state of the application includes an image and/or view hierarchy;

using a result of the semantic analysis of the application state for the application, determining if the switch condition of the automated content switching rule has been met; and in response to determining that the switch condition of the automated content switching rule has been met, executing the conditioned action to initiate the at least one operation on the user computing device to discontinue user interaction with the interactive content.

7. The method of claim 6, wherein the interactive content includes a video game, a video, a movie, a song, an e-book, a web page, or social media content, wherein the non-temporal triggering event specifies reaching a predetermined point or milestone in the interactive content, and wherein the predetermined point or milestone includes an end point, a level, a predetermined event, a chapter, an episode, a game, or a video.

8. The method of claim 6, wherein the at least one operation for the conditioned action is configured to restrict future user interaction with the interactive content, wherein executing the conditioned action to initiate the at least one operation on the user computing device includes blocking a subsequent user attempt to interact with the interactive content, and wherein the at least one operation for the conditioned action is configured to restrict future user interaction with the application, a function of the application, or a category or type of interactive content, application or function.

9. The method of claim 6, wherein the user input includes a natural language input, and wherein generating the automated content switching rule includes performing user intent classification with an automated assistant to determine the switch condition and conditioned action for the automated content switching rule.

10. The method of claim 6, wherein the switch condition is a first switch condition and the conditioned action is a first conditioned action, wherein the automated content switching rule further includes a second switch condition and a second conditioned action configured to initiate at least one operation on the user computing device in response to the second switch condition being met, and wherein the second switch condition is activated only after the first switch condition is met and the first conditioned action is executed.

* * * * *